United States Patent [19]
Alvarez

[11] 3,739,455
[45] June 19, 1973

[54] METHOD OF MAKING FRESNELLED OPTICAL ELEMENT MATRIX

[75] Inventor: Luis W. Alvarez, Berkeley, Calif.

[73] Assignee: Humphrey Research Associates, Oakland, Calif.

[22] Filed: Apr. 5, 1971

[21] Appl. No.: 131,156

[52] U.S. Cl. .............. 29/425, 29/557, 264/1, 350/211, 350/213, 350/320
[51] Int. Cl. ............................... B23p 17/00
[58] Field of Search .............. 29/411, 425, 557; 264/1, 219; 350/189, 213, 211; 425/808; 18/DIG. 30

[56] References Cited
UNITED STATES PATENTS

| | | | |
|---|---|---|---|
| 1,906,655 | 5/1933 | Stimson | 350/103 X |
| 2,441,747 | 5/1948 | Beshgetoor | 350/211 X |
| 2,915,935 | 12/1959 | Pabst et al. | 350/213 X |
| 3,305,294 | 2/1967 | Alvarez | 351/169 |
| 3,417,959 | 12/1968 | Schultz | 350/102 X |
| 3,542,453 | 11/1970 | Kantor | 264/1 X |
| 3,632,696 | 1/1972 | Jones | 264/1 |

FOREIGN PATENTS OR APPLICATIONS

| | | | |
|---|---|---|---|
| 1,050,223 | 2/1959 | Germany | 88/57 |

*Primary Examiner*—Charles W. Lanham
*Assistant Examiner*—V. A. DiPalma
*Attorney*—Townsend and Townsend

[57] ABSTRACT

A process for producing the matrix of a fresnelled optical element is disclosed. Discrete elongate elements are first aligned and held in side-by-side relation so that the element ends together can be formed to the shape of a continuous optical surface. Thereafter the elements are released and realigned, typically on a surface, to form the matrix of a fresnelled lens element. Techniques of changing the angular alignment of the discrete faces of the lens elements are described.

5 Claims, 12 Drawing Figures

FIG._1
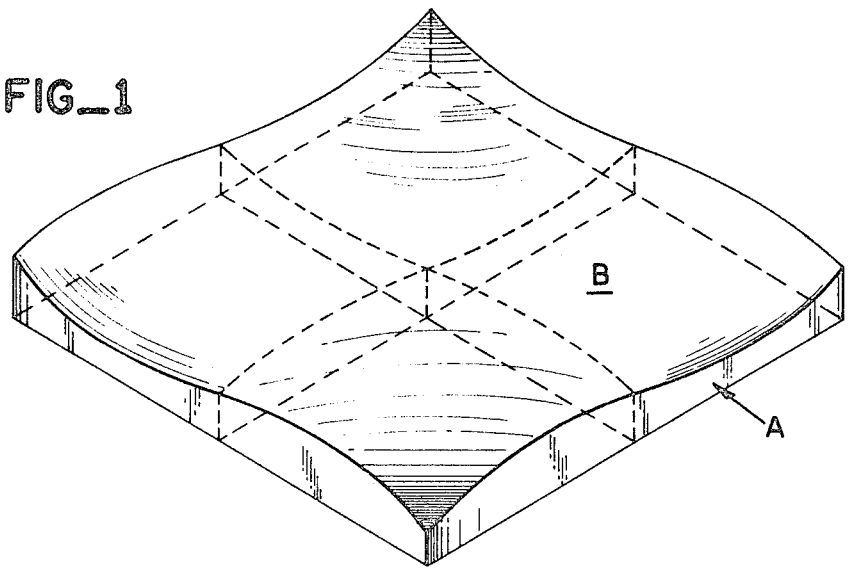
FIG._2
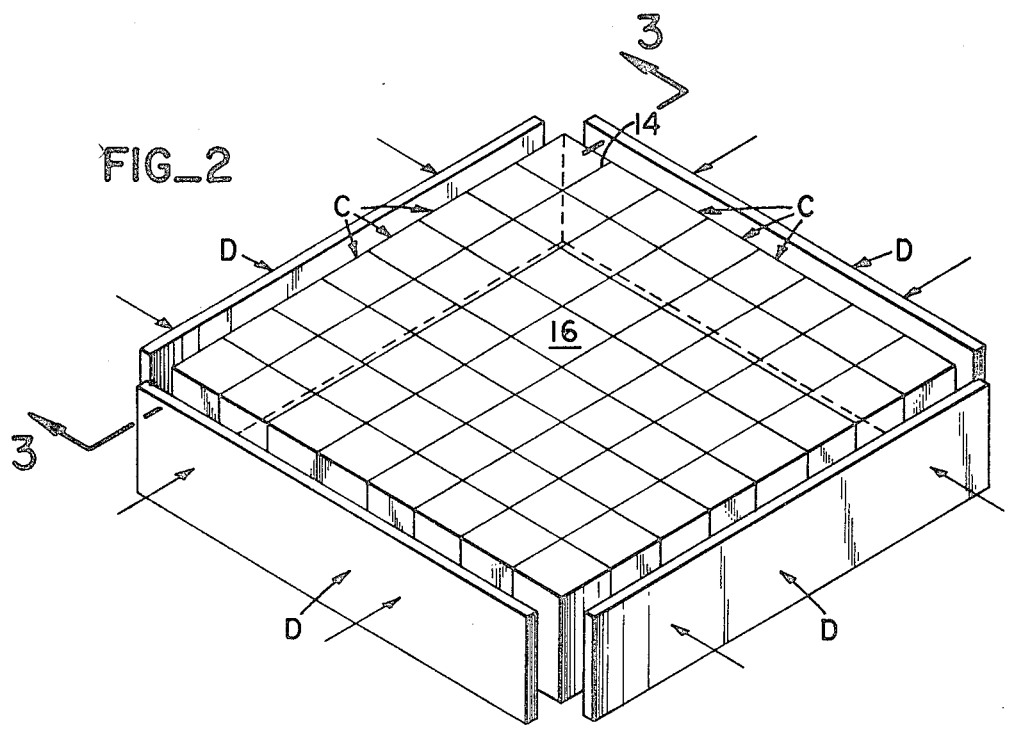
FIG._8
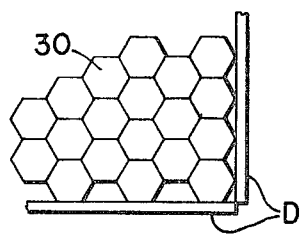
INVENTOR.
LUIS W. ALVAREZ
BY
*Townsend and Townsend*
ATTORNEYS

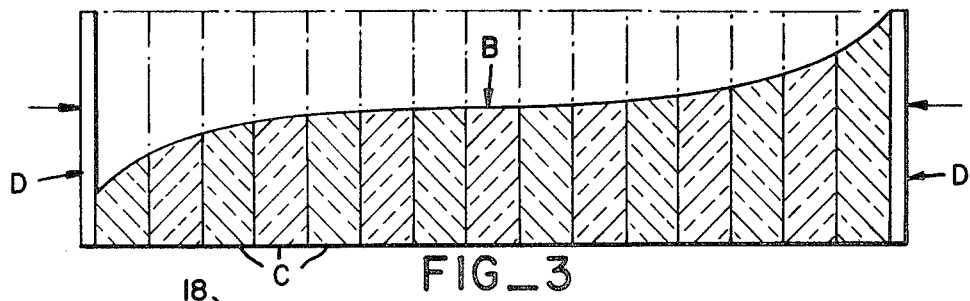
FIG_3
FIG_4
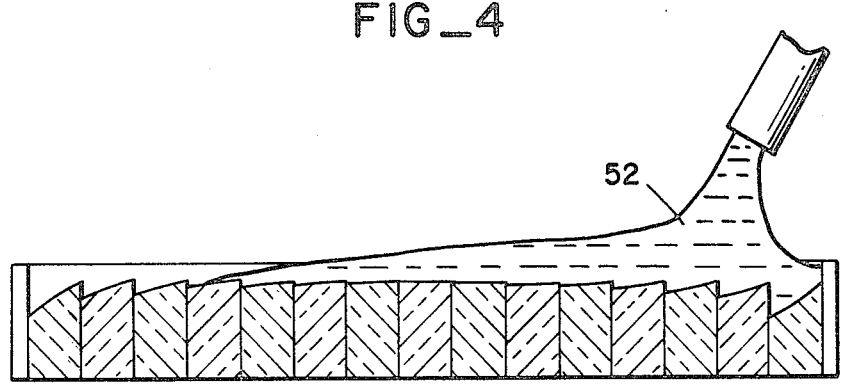
FIG_5
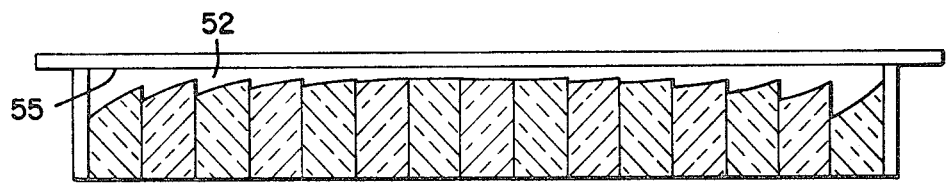
FIG_6
FIG_7
INVENTOR.
LUIS W. ALVAREZ
BY
Townsend and Townsend
ATTORNEYS

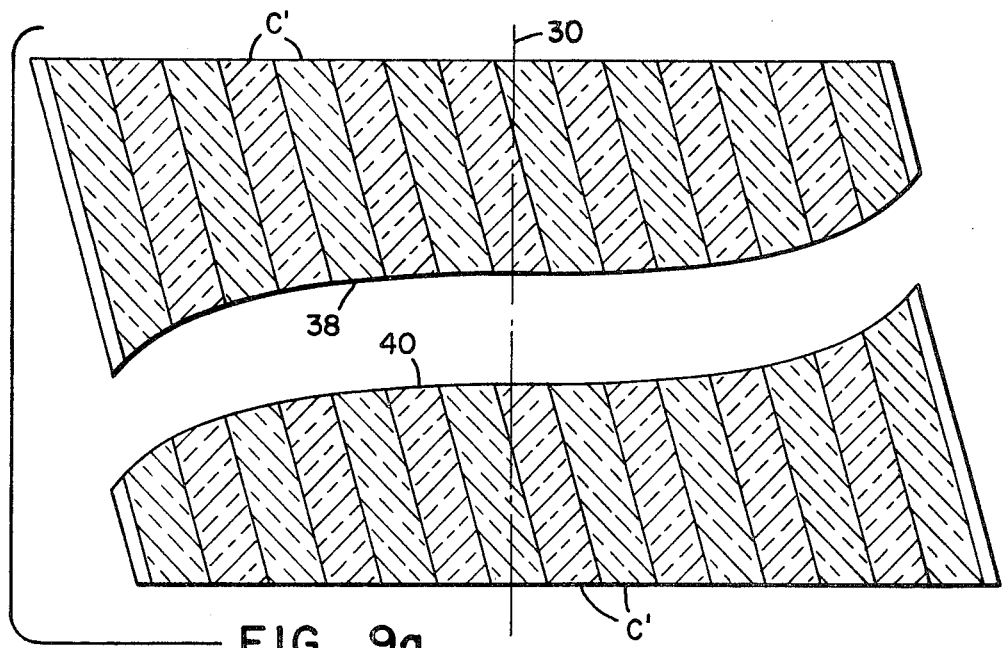
FIG_9a
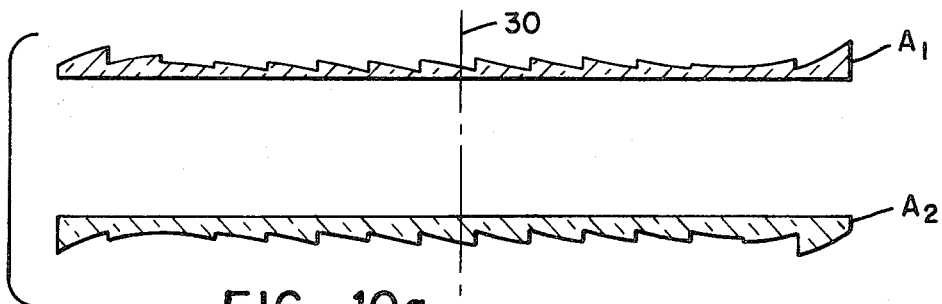
FIG_10a
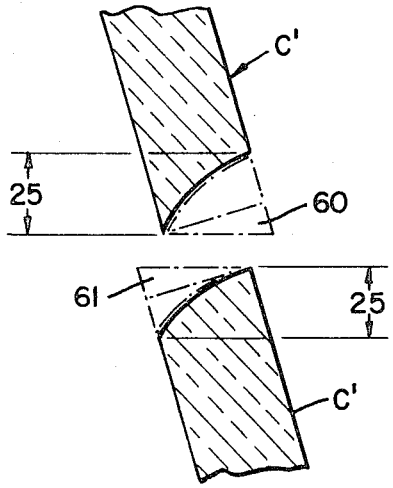
FIG_9b
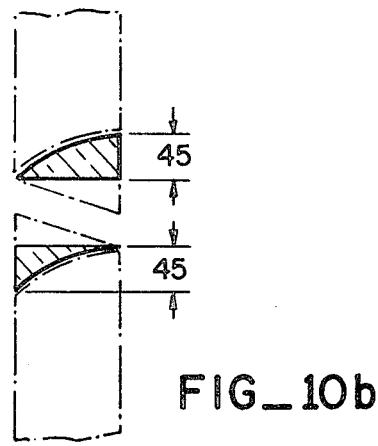
FIG_10b
INVENTOR.
LUIS W. ALVAREZ
BY Townsend and Townsend
ATTORNEYS

METHOD OF MAKING FRESNELLED OPTICAL ELEMENT MATRIX

This invention relates to an optical element of reduced thickness and its process of and apparatus for manufacture.

The technique of fresnelling lenses to reduce their thickness is well known. Typically, a thin sheet of optic material is provided with a series of side-by-side inclined surfaces. These surfaces are each sloped with respect to either a concentric point of generation in the case of a lens or a straight line in the case of a prism so that their combined slopes deflect light in a manner similar to the planar surface of a single optical element having an uninterrupted surface.

Unfortunately, conventional fresnelling techniques are complex; precision optically sloped surfaces must be formed in exact side-by-side relation. Moreover, these conventional fresnelling techniques are designed for generating the fresnelled equivalent of optical elements which are symmetrical about either a line (as in the case of conventional lenses) or alternately symmetrical about a plane (as in the case of optical wedges). Where the optic surfaces are complex, separate generation of the fresnelled surfaces in side-by-side relation by conventional methods is impractical, if not impossible. (For an example of such a non-symmetrical optical surface, see U.S. Pat. No. 3,305,294, entitled "Two-Element Variable-Power Spherical Lens)".

An object of this invention is to disclose a process and apparatus for reducing the thickness of virtually any optic surface, symmetrical or unsymmetrical. Accordingly, a plurality of discrete elongate elements are aligned in parallel and lengthwise or longitudinal side-by-side relation. These aligned elements are rigidly clamped in their side-by-side relation to prevent relative movement therebetween. Thereafter, a continuous optic surface is formed at the first end of the elements. When the optic surface is formed, the elongate elements are partially released from their clamped disposition, maintained in their original side-by-side relation, and realigned at their formed first ends against a preselected surface, which surface is typically planar. When realigned, the first ends of the elements define a mosaic of individual optic surfaces which can be used as a mold for optic elements.

An advantage of this invention is that the disclosed process can be used for the manufacture of a male lens mold from which female molds, and finally, optic elements can be directly cast or otherwise formed.

Yet another advantage of this invention is that the matrix produced by the disclosed process can be used for manufacturing directly a lens by the expedient of pouring fluidized optic material over the matrix produced.

A still further advantage of this invention is that where the elongate elements are manufactured of optic material, the end result of the disclosed process can be a lens.

Yet another advantage of this invention is that the optic surface can be formed within the ends of the elongate elements by virtually any known technique; such known techniques can include conventional grinding or, alternately, electric discharge machining of the optic surfaces.

Still another advantage of this invention is that this technique can be adapted to reduce the thickness or depth of optical peaks in the fresnelled surface.

Other objects, features, and advantages of this invention will become more apparent upon reading of the following specification and referring to the attached drawings in which:

FIG. 1 is a perspective view of a non-symmetrical optical surface which is used as the matrix for the illustrated process;

FIG. 2 is a perspective view of the discrete, elongate elements shown held in longitudinal side-by-side relation prior to forming of the optic surface thereon;

FIG. 3 is a side elevation section along lines 3—3 of FIG. 2 illustrating a single row of discrete, elongate elements after the surface of FIG. 1 has been formed thereon;

FIG. 4 is a side elevation section similar to FIG. 3 illustrating the realigned position of the elements at their polished surface against a plane;

FIG. 5 is a side elevation section similar to FIG. 4 illustrating the realigned elongate elements being used as a female mold surface for forming a lens in accordance with this invention;

FIG. 6 is a side elevation section similar to FIG. 5 showing a plane surface formed in the optic material placed within the mold of FIG. 5;

FIG. 7 is a cross-sectional view of the optic element of FIG. 6 after it has been removed from the mold;

FIG. 8 is a plan view of an alternate, hexagonal cross-sectional configuration of the discrete elements used in this process;

FIG. 9a is a side elevation view analogous to FIG. 3 illustrating the discrete optical elements inclined with respect to one another during the forming of the optical surface on the ends of the elements;

FIG. 9b is an enlarged view of two overlying optical elements illustrating the elements in the inclined and overlying position;

FIG. 10a is a side elevation analogous to FIG. 7 illustrating the completed lens elements formed; and, FIG. 10b is an enlarged view of that part of the lens formed from the section illustrated in FIG. 9b.

With reference to FIG. 1, an optical element A is illustrated incorporating therein a complex optical surface B. The optical surface B herein illustrated is fully described in U.S. Pat. No. 3,305,294, entitled "Two-Element Variable-Power Spherical Lens."

With respect to FIG. 2, apparatus suitable for the technique of this invention is illustrated. A plurality of elongate elements C are shown being held in longitudinal side-by-side relation by clamps D.

Elements C are here illustrated as square in cross section. These elements at their respective sides 14 contact one another so as to form in the aggregate a complete and uninterrupted surface 16.

Elongate elements C can be fabricated of virtually any material. Typically when the technique is to be used for forming a male mold for the subsequent production of optical elements, elements C can be of opaque, solid material. Such materials can include metals, plastics, and virtually any other solid material, the only limitation being that the solid material be capable of being formed with the optical surface B, typically by grinding followed by polishing of the surface 16.

It should be realized that the elements C themselves could be made from an optic material. This, however, is not efficient. The present technique can be used with greater utility in forming molds on which lenses may subsequently be formed.

With reference to FIG. 3, a side elevation section of the elongate elements C is illustrated. Typically, clamps D are urged towards one another to rigidly hold the elements C in side-by-side relation. Thereafter, the continuous complex optical surface B is formed within the exposed ends of the optical elements. This results in substantial portions of the length of the elongate elements C being cut away at their exposed ends, each of the elements being provided with the complex curvature of optical surface B.

The forming or grinding and polishing of the optical surface B within the upwardly exposed ends of elongate elements C can be accomplished by virtually any known technique. For example, the grinding technique described and illustrated in application Ser. No. 831,437, filed June 9, 1969, entitled "Lens Surface Grinding Method and Apparatus" can be used. Alternately, electric discharge machining techniques can be used, the rough contour of optical surface B first being formed in the electric discharge machining process and thereafter the surface B being polished by conventional polishing techniques.

With reference to FIG. 4, the next sequential step in the production of the lens element is illustrated. Typically, once the surface B has been impressed or ground and polished within the exposed ends of elements C, pressure on the clamp members D is relaxed. Elements C are free to move longitudinally towards plane surface 18 in their original side-by-side orientation within clamps D. Typically, the elements C are moved upwardly and towards the plane 18 until the highest spot in each optical surface just contacts plane 18. Such movement will give the row of elongate elements C the configuration shown in FIG. 4.

Two features can be briefly emphasized. First upon realignment, the ends of the elements C remote from the optic surface can be reduced in length. This has been done in FIG. 4.

Secondly, the elements C even when shortened, will be maintained with a relative high length to width ratio. This will impart mechanical stability to the lens elements when they are braced in side-by-side relation.

With reference to FIG. 5, a fluidized optical material 52 is shown being poured interior of a mold. The mold is formed by sidewalls D on either side with the formed end of discrete elements C forming the bottom surface thereof. It will thus be seen that a continuous optical surface is formed across the surface of the mold.

Referring to FIG. 6, the fluidized optical material 52 is shown solidified within the mold. Moreover, a continuous and planar surface has been formed, typically by impressing a regular surface (such as the plane surface 55 here shown) at the upper surface of the solidified optic material. It is thus seen that the optical element is completely formed. This element is shown removed from the mold in the illustration of FIG. 7.

Comparing the lower surface of the lens element illustrated in FIG. 7 to the upper surface of the mold illustrated in FIG. 4, one important observation can be made. It will be noted that the lens element here formed is in a cross section which is a mirror image of the lens surface initially formed on the ends of the discrete elements C'. As should be apparent to those skilled in molding, the lens element shown in FIG. 7 can itself be used for a subsequent mold. This will result in a lens being formed which has an optical cross section identical to the cross section originally ground and polished on the element C'.

In the production of the lenses utilizing the apparatus and technique of this disclosure, it is preferred that the individual elongate element C have a contiguous contacting surface around the entirety of their periphery. For that reason these elements have been here illustrated as each being of identical and square dimension. It will be realized, however, that some departure can be made from this contiguous configuration. For instance the rods could be hexagonally shaped and placed in vertical side-by-side alignment as shown at cross section 30 of FIG. 8. It is important that only the elements do not angularly move during their realignment and that any interval between contiguous elements C be small enough to prevent the penetration of the optic material being molded and not appreciably interrupt the continuity of the optic surface being formed.

In the fabrication of this lens, one important limitation will be noted. Referring to the left-hand element 20 or the right-hand element 22, it will be noted that the optical surface thereon has a peak of height 25. As a practical matter, the lens element formed must be at least as thick as the height 25 of the peak located at the point of maximum slope on the optic surface.

Referring to FIGS. 9a, 9b, 10a and 10b, a technique for reducing this total peak height is illustrated. Referring to FIG. 9a, two complementary lens surfaces 38 and 40 are illustrated ground and polished in a plurality of elongate elements C'. Elements C' are in parallel alignment with their elongate axis inclined with respect to the normal of the reference surface from which lens surfaces 38 and 40 are ground and polished. Optical surfaces 38 and 40 are generated in the exposed surfaces of elements C' from a reference plane which is substantially normal to a vertical axis 30. Unlike the elements C', this reference plane is not inclined.

After surfaces 38 and 40 have been ground and polished in the exposed end of element C', these elements are aligned parallel to the referenced axis 30. Thereafter the individual elements C' at their ground surfaces are aligned against a plane in a manner precisely analogous to that step schematically illustrated with respect to FIG. 4. Thereafter, the excess length of some of the elements are removed and fluidized material formed as by pouring or alternately impressing against the surface defined at the element ends. Optical elements having the configuration of FIG. 10a are thus formed.

Referring to FIG. 9b, when the elongate elements C' are slanted, it will be observed that the increment 25 of the total peak height of the optic surface remains substantially the same as that peak height previously referred to in the example of FIG. 6. When, however, the elements are relatively moved with respect to one another to have a vertical alignment parallel to referenced axis 30, the peak height will be reduced. This reduction will occur as illustrated at 45 in FIGS. 10a and 10b.

Referring to FIG. 9b, the two overlying elements C' on the extreme left-hand matrix of FIG. 9a are illustrated. At FIG. 10b these same two elements are shown in broken lines overlying the arcuate portion of the complementary optical surfaces which they form in FIG. 10a.

It will be observed that if elements C' shown in FIG. 9b had been used as a mold, an additional wedge of optical material 60 and 61 would have been molded into each optic surface. These wedges are illustrated schematically in broken lines in FIG. 9b. When, however, the elements C' shown in broken lines in FIG. 10 are aligned to the vertical, these wedges are not molded; rather they are each subtracted from the molded optic surface. Moreover, it will be observed in FIG. 9b that the wedges generated are each opposite and equal. Hence, assuming that the slanted elements C' were used as a mold in FIG. 9b the wedges would cancel one another. Hence, the optics of a lens element generated from the matrix shown in FIG. 9b will be the same as the lens elements illustrated in FIG. 10b.

Additionally, it will be noted that in this particular case, the two lens surfaces are overlying and complementary to one another. It will be observed that lens element $A_1$ in FIG. 10a is the equivalent of the optical surface 40 generated in the matrix of FIG. 9a and that lens element $A_2$ is the equivalent of optic surface 38 shown in FIG. 9a. Hence, whether the matrix is used as a mold for each of the elements or alternately as a matrix for forming a female mold from which optic elements are subsequently formed, the optic of the produced and overlying lens elements will be the same. This, of course, will only be true where there are two lens elements of complementary curvature.

It should be noted in the illustration of FIG. 10a that each lens element of the complementary lens elements is formed with a flat surface confronting the remaining complementary lens element. This configuration of the lens elements enables the two lenses to slide relative to one another without becoming locked at their respective irregular optic surfaces on the opposite side.

Two important observations can be made about the technique described with reference to FIGS. 9 and 10. First, it is possible to construct an optic element in which some of the rows of optical elements C are aligned substantially normal to the optical surface being generated and other optical elements such as elements C' are slanted. Secondly, relative movement between the overlying elements such as element $A_1$ and underlying optical elements such as $A_2$ will produce no distortion provided that relative movement occurs in a direction which is parallel to the path of the slanted optical elements.

In the production of the lens elements herein illustrated, the width of the elongate elements exposed to the entering light will effectively have the same considerations applied thereto as the case of more conventional fresnelling techniques. Briefly stated, the area of the exposed elongate ends of the optical element mosaic must be maintained with an aperture size so that it will not greatly degrade the optic resolution desired through the lens element. While considerations of aperture size will vary with particular application desired, it can be generally observed that where the mosaic lens elements are to be used in conjunction with, and relatively close to, the human eye such apertures may be in the range of 5 mm. diameter or less.

It should be appreciated that the matrix produced by the process of this invention can be used in a multitude of ways. For example, optic material can be poured and thereafter solidified in the mold formed by the matrix. Alternately, the mold can be used to impress under pressure the optic surface in a material. Further, a particularized solid could be placed within the mold, thereafter melted and solidified into a solid optical material. Likewise, virtually all other techniques adaptable to a mold or matrix could be used.

While one embodiment of this invention has been shown and described, it will be apparent that other applications and modifications of this device can be made without departing from the true spirit and scope of this invention.

I claim:

1. A process for producing the matrix of a fresnelled optical element from a matrix of discrete elements comprising the steps of: providing a plurality of discrete elongate elements, each element having first and second ends with a plurality of elongate side surfaces therebetween; aligning said elongate elements in side-by-side relation with said first ends forming a common surface and said elongate side surfaces of each element in contiguous contacting relation with adjacent elements, said side surfaces permitting relative movement between said elements in the direction of the elongation of said elements and said elongate side surfaces inhibiting relative rotation of said elements about the direction of elongation of said elements; holding the elements to prevent relative movement at said side surfaces in the direction of elongation of said elements, forming a continuous optical surface on the common surface defined by the first ends of said aligned elements; releasing said hold on said elements; realigning said elements in the direction of elongation of said elements to a second aligned position with the peak of the first common ends of each element being on a common surface, said elements during said realigning being maintained in said side-by-side relation with relative movement occurring at said contiguous contacting elongate side surfaces; and, holding the elements in fixed relative alignment in the second aligned position to form a fresnelled matrix of said continuous optical surface.

2. A process for producing an optical element from a matrix of elements comprising the steps of: providing a plurality of discrete elongate elements, each discrete elongate element having first and second ends with a plurality of elongate side surfaces therebetween; aligning said elongate elements in parallel, side-by-side relation with said first ends forming a common surface and said elongate side surfaces in continuous contacting relation, said side surfaces permitting relative movement between said elements in the direction of the elongation of said elements and said elongate side surfaces preventing relative rotation of said elements about said direction of elongation of said elements; disposing said aligned elongate elements in a first angular relationship with a preselected plane; holding the elements to prevent relative movement in the direction of elongation of said elements; forming a continuous optical surface on the common surface defined by the first ends of said aligned elements; releasing said hold on said elements; aligning said elements to a second angular relationship with respect to said preselected plane; realigning said elements in the direction of elongation of said elements by relative movement of said elements at said contiguous contacting surfaces to a second aligned position with the peak of the first common ends of each element being on a common surface, said elements during said realigning being maintained in said side-by-side relation with relative movement occurring at said contiguous contacting surfaces; and, holding the elements in fixed relative alignment in the second aligned position to form a fresnelled matrix of said continuous optical surface in said second realigned position.

3. The process of claim 2 and wherein said preselected plane and said common surface are coincidental.

4. A process for producing a fresnel matrix of first and second optical elements for use in overlying relation, said process comprising the steps of: providing first and second sets of discrete elongate elements, each elongate element having first and second ends with a plurality of elongate side surfaces therebetween; aligning the elongate elements of each set in parallel side-by-side relation with said first ends of each element forming a common surface for each set of elements and said elongate side-by-side surfaces in each set of elements in contiguous contacting relation, said side surfaces permitting relative movement between the elements of each set in a direction of the elongation of said elements and said elongate side surfaces preventing relative rotation of said elements about said direction of elongation of said elements of each set; aligning the elements of both sets to a first angular relation with respect to a preselected plane; holding the elements of each set to prevent relative movement in the direction of elongation of said elements; forming first and second continuous optical surfaces on the common surfaces of said first and second element sets respectively; releasing said hold on said element sets; realigning said elements of each set in the direction of elongation of said elements to a second angular position with respect to said preselected plane; realigning said elements in the direction of elongation of said elements to a second aligned position with the peak of the first common ends of each element being on a common surface; said elements during said realigning being maintained in said side-by-side relation with relative movement occurring at said contiguous contacting surfaces; and, holding the elements of each of the first and second sets in fixed relative alignment in the second aligned positions to form a fresnelled matrix of said continuous optical surfaces on each element set in said second realigned position.

5. The process of claim 4 and wherein said common surface and said preselected planes are coincidental.

* * * * *